United States Patent

Reutlinger

[11] Patent Number: 4,573,355
[45] Date of Patent: Mar. 4, 1986

[54] DEVICE FOR THE DETERMINATION OF THE UNBALANCE OF PROPELLERS

[76] Inventor: Wolf-Dieter Reutlinger, Novalisstrasse 5, D-6100 Darmstadt, Fed. Rep. of Germany

[21] Appl. No.: 560,138

[22] Filed: Dec. 12, 1983

[30] Foreign Application Priority Data

Dec. 22, 1982 [DE] Fed. Rep. of Germany ....... 3247503

[51] Int. Cl.$^4$ ............................................. G01M 1/02
[52] U.S. Cl. ........................................ 73/455; 73/483
[58] Field of Search ................. 73/455, 483, 484, 485, 73/486

[56] References Cited

U.S. PATENT DOCUMENTS 4,467,650  8/1984  Hines et al. ............................ 73/483
4,489,605 12/1984  Kops ..................................... 73/455

Primary Examiner—Stewart J. Levy
Assistant Examiner—John E. Chapman, Jr.
Attorney, Agent, or Firm—Lee, Smith & Zickert

[57] ABSTRACT

A propeller 12 is supported by means of a propeller accommodation 10 comprising a fixing flange on a tubular hollow bending spring 16. A tubular transmitting member 24 coaxial to the hollow bending spring 16, is affixed to the propeller accommodation 10. The position of the transmitting member 24 is detected in two coordinates by sensors 26 and displayed as a light spot by a vector display instrument. This results in calibratable unbalance display. An axial plunger 32 mounted on the hub 14 of the propeller 12 for the blade adjustment extends into the tubular transmitting member 24 and does not obstruct the mounting of the propeller 12 on the propeller accommodation 10.

17 Claims, 4 Drawing Figures

DEVICE FOR THE DETERMINATION OF THE UNBALANCE OF PROPELLERS

The invention relates to a device for the determination of the unbalance of propellers, comprising (a) a propeller accommodation permitting mounting of the propeller with substantially vertical axis (b) a device for universally pivotable supporting of the propeller accommodation and (c) sensors for measuring the inclination of the propeller accommodation.

The unbalance of propellers cannot be measured in the same way as the unbalance of normal unbalance bodies, namely by driving the unbalance body and measuring the force or displacement oscillation caused by the unbalance. As the propeller by its form and in accordance with its purpose generates a strong air flow, a high driving power would be necessary to drive the propeller, which causes a high axial force. The measurement would also be disturbed by the air flow. Therefore the propeller would have to be driven in a vacuum, which, causes technical problems and requires in any case an unjustifiably high technical expenditure.

Therefore devices constructed in a different way have been provided for balancing propellers, in which devices the measurement without rotating the propeller, is based on the action of gravity on the mass of the propeller unsymmetrically distributed by the unbalance.

In the simplest device the propeller finally assembled is screwed onto an accommodation flange provided with a centering and mounted at the front end of a shaft exactly rotating without deflection. This shaft is placed horizontally on two roller pairs. Thereon the shaft with the propeller attached thereto swings out in pendulum fashion. The heavier propeller-blade then points downwardly. This method is simple, but does not allow direct determination of the balancing masses to be applied to the propeller-blades or to the hub of the propeller. In particular problems arise with propellers having more than two propeller-blades, because here normally balancing in components is required, that is resolving the resulting balancing mass in three or more components at predetermined positions. The balancing is effected substantially empirically and requires considerable expense of time.

In other prior art devices the propeller is centrally accommodated on a sleeve, which is closed at its upper end by a cover polished on its underside. A plate-like platform, the surface of which extends perpendicularly to the longitudinal axis of the sleeve, is provided at the lower open end of the sleeve. This sleeve is placed over a vertical mandrel fixed to a pedestal, a steel ball being provided at the upper end of said mandrel. The sleeve with the propeller placed thereon swing about this steel ball. Thereby the platform provided at the lower end of the sleeve is deflected from its horizontal position. The amount of this deflection from the horizontal position depends on the unbalance of the propeller. Two bubble levels angularly spaced by 90° are arranged on the platform. By these bubble levels the deflection of the platform out of the horizontal position can be determined by amount and direction. Then balancing weights are affixed at the balancing positions constructively provided therefor on the propeller or its hub until the platform again assumes its horizontal position. This is controlled by the bubble level.

Devices of this type are also known, in which electrically transmitting inclinometer are provided instead of the bubble levels. Thereby the device can be calibrated with the aid of comparison unbalances. Thereby the balancing procedure can be carried out more quickly.

A faster decay of the swinging motion of the sleeve can be obtained by oil dampers.

In such a device the angle of inclination depends not only on the unbalance but also of the mass and geometry of the propeller. Thus a calibration is required for each type of propellers. Furthermore the sleeve must be closed on its upper side to permit supporting on the ball. Propellers having adjustable pitch however often comprise plunger-like portions which extend out of the hub in the direction of the driving shaft. These plunger-like portions serve in practical operation of the propellers for adjusting the blades in the propeller by means of hydraulically moved elements arranged in driving shaft. Such propellers generally cannot be balanced with a device of the type described.

It is the object of the invention to provide a device of the type defined above such that an unbalance indication independent of the mass and geometry of the propeller is obtained.

Furthermore the device is to be adapted for balancing any propeller, also those having central axially projecting plunger-like portions for adjusting the blades.

According to the invention the above indicated object is achieved in that (d) the device for supporting the accommodation of propeller is a tubular hollow bending spring.

The hollow bending spring is deflected in the direction of the unbalance and with a torque proportional to the unbalance (unbalance mass × radius). The bending of the hollow bending spring is proportional to this torque and substantially independent of the weight and the geometry of the propeller.

A central portion projecting axially from the hub can extend into the hollow bending spring without obstructing the fixing of the propeller to the propeller accommodation.

Modifications of the invention are subject matter of the sub-claims.

Embodiments of the invention will now be described in greater detail with reference to the accompanying drawings.

Figure 1:
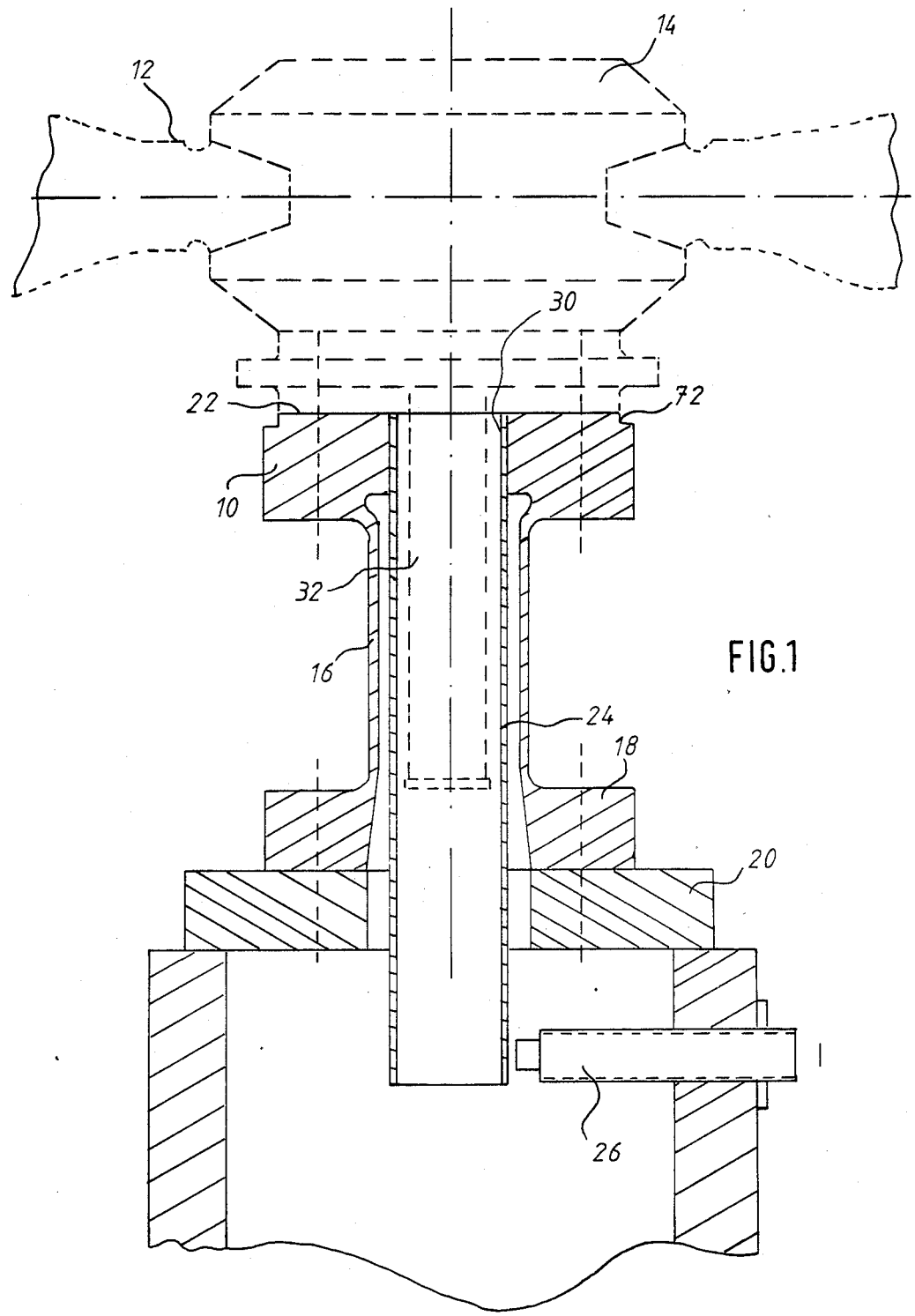
FIG. 1 shows a vertical section through a device for the determination of unbalance of propellers.

Numeral 10 designates a propeller accommodation onto which a propeller 12 is screwed with its hub 14. The propeller accommodation is universally pivotably supported. A tubular hollow bending spring 16 serves as device for supporting the propeller accommodation 10. In the embodiment described, the propeller accommodation 10 comprises a flange of the hollow bending spring 16. At is lower end the hollow bending spring is screwed by means of a flange 18 onto a tubular supporting frame 20. The supporting frame, in turn, is anchored at the bottom of the installation site. It is ensured that the surface 22 of the propeller accommodation is carefully adjusted horizontally to all sides by a bubble level.

Figure 2:
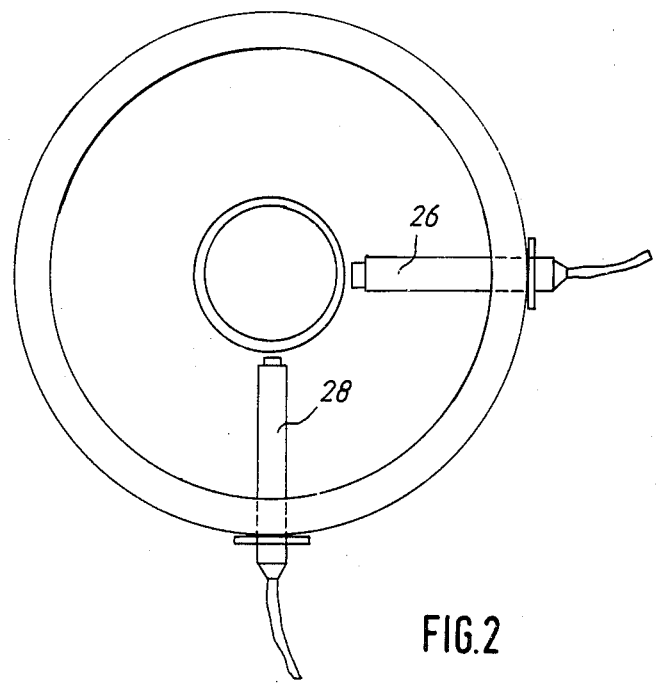
FIG. 2 shows a view as seen from below in FIG. 1.

A transmitting member 24 rigid against deflection and extending into the hollow bending spring 16 is attached to the propeller accommodation 10. Sensors 26,28 (FIG. 2) are mounted, on the supporting frame 20 and respond to the movement of the transmitting member 24 and thus to the inclination of the propeller accommodation 10. The transmitting member 24 is of tubular shape and is arranged coaxially within the hollow bending spring 16. The propeller accommodation 10 has an accommodation flange provided with a central aperture 30. The tubular transmitting member is held in this aperture 30. A central plunger 32 extending axially out of the hub 14 for adjusting the pitch of the propeller extends coaxially into the transmitting member 24 and the hollow bending spring 16, such that also in this case the mounting of the propeller 12 on the propeller accommodation 10 is not obstructed.

If there is an unbalance of the propeller 12 to be balanced, the hollow bending spring 16 is deflected to one side. The direction of the deflection corresponds to the resultant position of unbalance. The amount of the deflection corresponds —calibratably— to the amount of unbalance. The amount of the deflection depends on the torque exerted on the unbalance mass by the force of gravity, that is mass times radius. The hollow bending spring is deflected proportionally to this torque and independent of the mass or the geometry of the propeller. The deflection is measured by the two sensors 26 and 28. The sensors 26 and 28 are angularly offset by 90°, such that they detect the components of the unbalance in two mutually perpendicular planes. Compression of the hollow bending spring 16 by the weight of the propeller practically does not affect the measurement.

Figure 4:
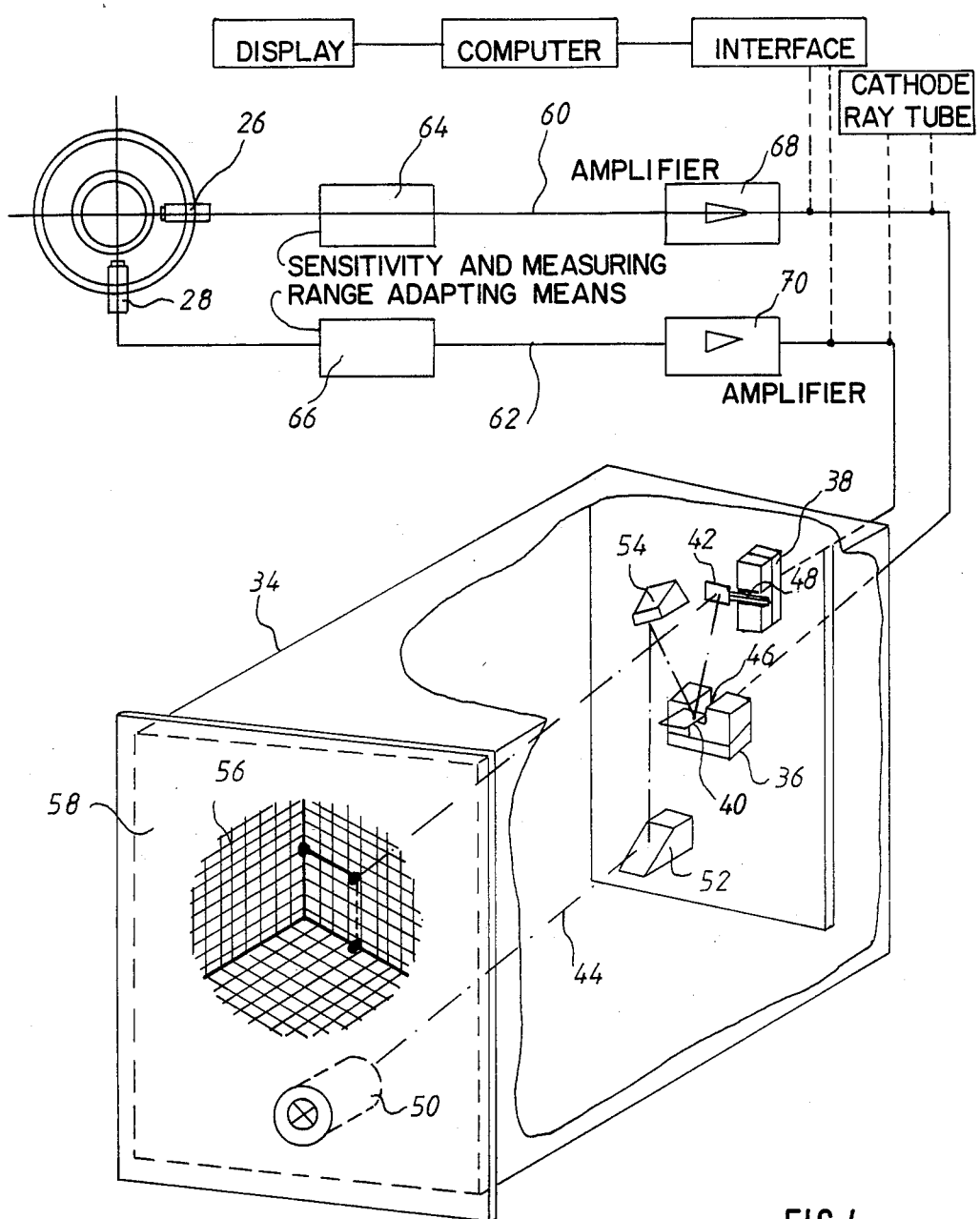
FIG. 4 shows the signal processing and display in a device for the determination of unbalance of propellers.

The sensors 26 and 28 may be dial gauges. They may also be preferably electrically transmitting position sensors. As illustrated in FIG. 4, the signals of the sensors 26 and 28 are applied as components to a vector display instrument 34. In the illustrated embodiment the vector display instrument 34 is a light spot display having two mirror galvanometers 36 and 38, the mirrors 40 and 42, respectively, being arranged successively in the path of rays of a display light beam 44 and are deflected about crossed axes 46 and 48, respectively. Each of the sensor signals is applied to one of the mirror galvanometer 36 or 38. The display light beam 44 is generated by a light beam 50 and directed by mirrors 52, 54 first to mirror 40 of the mirror galvanometer 36 and therefrom to mirror 42 of the mirror galvanometer 38 and falls on a display screen 56 of the front plate 58 of the vector display instrument 34. By mirror 40 of the mirror galvanometer 36 the display light beam 44 is deflected in horizontal direction while by mirror 42 it is deflected in vertical direction. Thus the light spot represents the unbalance vector. As can be seen from FIG. 4, the display screen 56 is provided with such a scaling, that the resultant unbalance thus displayed may be read directly in components referenced to constructively predetermined balancing positions. In the illustrated embodiment three balancing positions angularly spaced by 120° are provided. These balancing positions may correspond to the propeller-blades or to constructively predetermined balancing locations on the propeller hub which might be angularly offset thereto.

Each of the two sensors 26 and 28 is connected to an associated measuring channel 60 and 62, respectively, each of which comprises its own sensitivity and measuring range adapting means 64 and 66, respectively, independent of the other measuring channel. Furthermore measuring amplifiers 68 and 70, respectively, are arranged in each measuring channel 60,62.

Figure 3:
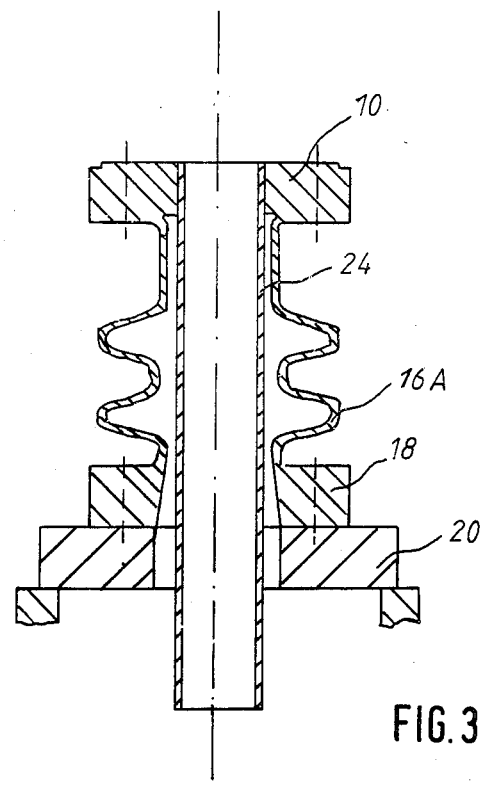
FIG. 3 shows a modificated embodiment of the device.

The described arrangement may be modified in various ways:

As illustrated in FIG. 3, the hollow bending spring may be formed as bellows spring 16 A, whereby a higher bending elasticity is achieved.

The vector display instrument may comprise a cathode-ray tube with a horizontal deflection system and a vertical deflection system. One of the sensor signals is then applied to the horizontal deflection system and the other sensor signal is applied to the vertical deflection system.

The device for the determination of unbalance at propellers may also comprise a computer provided with a screen and to which the signals of the sensors are applied through an interface. The computer may then be designed for selective alphanumeric display of the unbalance resultants or of the unbalance components or of the balancing masses associated with the unbalance components, with freely selectable numbers and angular positions of the balancing locations.

The propeller accommodation 10 may have an attachment flange for the propeller 12 with a plurality of accommodation bore patterns corresponding to the different bore patterns of the standardized propeller accommodations. The propeller accommodation may also have an attachment flange, to which intermediate flanges may be screwed, which are designed for different other accommodation and attachment devices. The attachment flange may have a spigot 72 for centering the intermediate flanges.

The bore pattern of the predetermined attachment bores in the different propellers may have different angular positions relative to the balancing positions provided on the propellers. Therefore it is advantagous, when the sensors 26,28 are mounted on a carrier rotatable substantially about the axis of the hollow bending spring 16 relative to a apparatus, base such as the supporting frame. Preferably this carrier is a ring which is rotatably mounted on the supporting frame 20 about its axis and the axis of the hollow bending spring 16 aligned therewith in its position of rest. This adjustability enables fast alignment of the measuring and balancing coordinates with each other.

Deviations between the axis of the supporting frame, towards which the sensors 26,28 are aligned, and the axis of the transmitting member 24, may be compensated mechanically or electrically, before the propeller is placed on the instrument, by appropriate angular adjustment of the carrier or ring, respectively, with the sensors.

I claim:
1. Device for the determination of the unbalance of propellers, comprising
   (a) a propeller accommodation (10) permitting mounting of a propeller (12) with substantially vertical axis,
   (b) a device for universally pivotable supporting of the propeller accommodation and
   (c) sensors (26,28) for measuring the inclination of the propeller accommodation,
characterized in that
   (d) the device for supporting the propeller accommodation (10) is a tubular hollow bending spring (16).
2. Device as set forth in claim 1, characterized in that
   (e) a transmitting member (24) rigid against deflections and extending into the hollow bending spring

(16) is mounted on the propeller accommodation of (10) and (f) the sensors (26,28) respond to the movement of the transmitting member (24).

3. Device as set forth in claim 2, characterized in that the transmitting member (24) has tubular shape and is arranged coaxially within the hollow bending spring (16).

4. Device as set forth in claim 3, characterized in that
(a) the propeller accommodation (10) has an accommodation flange provided with a central aperture (30) and
(b) the tubular transmission member (24) is held in this aperture (30).

5. Device as set forth in anyone of the preceding claims, characterized in that the hollow bending spring is a bellows spring (16A).

6. Device as set forth in anyone of the claims 2 to 4, characterized in that two sensors (26,28) angularly spaced by 90° are provided for measuring the deflection of the transmitting member (24).

7. Device as set forth in claim 6, characterized in that the sensors are dial gauges.

8. Device as set forth in claim 6, characterized in that the sensors (26,28) are electrically transmitting position sensors.

9. Device as set forth in claim 8, characterized in that the signals of the sensors are applied as components to a vector display instrument.

10. Device as set forth in claim 9, characterized in that
(a) the vector display instrument (34) is a light spot display having two mirror galvanometer (36,38), the mirrors (40,42) of which are arranged successively in the path of rays of a display light beam (44) and are arranged to be deflected about crossed axes (46,48) and
(b) each of the sensor signals is applied to one of the mirror galvanometers (36,38).

11. Device as set forth in claim 9, characterized in that,
(a) the vector display instrument comprises a cathode-ray tube having a horizontal deflection system and a vertical deflection system and
(b) one of the sensor signals is applied to the horizontal deflection system and the other sensor signal is applied to the vertical deflection system.

12. Device as set forth in claim 8, characterized in that each of the two sensors (26,28) is connected to an associated measuring channel (60,62), each of which comprises its own sensitivity and measuring range adapting means (64,66) independent of the other measuring channel.

13. Device as set forth in claim 8, characterized by a computer provided with a screen,
(a) to which the signals of the sensors are applied through an interface and
(b) which is arranged for selective alphanumeric display
($b_1$) of the unbalance resultants or
($b_2$) of the unbalance components or the balancing mass associated with the unbalance components, respectively, with freely selectable numbers and angular positions of the balancing locations.

14. Device as set forth in claim 1, characterized in that the propeller accommodation (10) has an attachment flange for the propeller with a plurality of accommodation bore patterns corresponding to the different bore patterns of the standardized propeller accommodations.

15. Device as set forth in claim 1, characterized in that the propeller accommodation (10) has an attachment flange and intermediate flanges are arranged to be screwed to this attachment flange, said intermediate flanges being adapted to accommodate different other accommodation and attachment devices.

16. Device as set forth in claim 15, characterized in that the attachment flange (10) has a spigot (72) for centering the intermediate flanges.

17. Device as set forth in claim 2, characterized in that the sensors (26,28) are mounted on a carrier rotatable relative to a base of apparatus substantially about the axis of the hollow bending spring (16).

* * * * *